United States Patent
Bera et al.

(10) Patent No.: US 11,195,039 B2
(45) Date of Patent: Dec. 7, 2021

(54) NON-RESOURCE-INTENSIVE OBJECT DETECTION

(71) Applicant: International Business Machines Corporation, Armonk, NY (US)

(72) Inventors: Jhilam Bera, Bangalore (IN); Vijay Kumar Ananthapur Bache, Bangalore (IN); Vijay Ekambaram, Chennai (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 16/813,779

(22) Filed: Mar. 10, 2020

(65) Prior Publication Data

US 2021/0287031 A1    Sep. 16, 2021

(51) Int. Cl.

| | |
|---|---|
| *G06K 9/20* | (2006.01) |
| *G06K 9/62* | (2006.01) |
| *G06K 9/46* | (2006.01) |
| *G06K 9/00* | (2006.01) |
| *G01V 8/10* | (2006.01) |
| *G06N 3/08* | (2006.01) |
| *G06N 3/04* | (2006.01) |

(52) U.S. Cl.
CPC ............. *G06K 9/2054* (2013.01); *G01V 8/10* (2013.01); *G06K 9/00711* (2013.01); *G06K 9/4652* (2013.01); *G06K 9/6257* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 5,614,960 A | * | 3/1997 | Chiba | G11B 27/28 348/415.1 |
| 7,136,507 B2 | * | 11/2006 | Han | G06K 9/00335 382/103 |

(Continued)

FOREIGN PATENT DOCUMENTS

| | | |
|---|---|---|
| AU | 2019101142 A4 | 10/2019 |
| RU | 2654126 C2 | 5/2018 |

OTHER PUBLICATIONS

Wu, Bichen, Forrest Iandola, Peter H. Jin, and Kurt Keutzer. "Squeezedet: Unified, small, low power fully convolutional neural networks for real-time object detection for autonomous driving." In Proceedings of the IEEE conference on computer vision and pattern recognition workshops, pp. 129-137. 2017. (Year: 2017).*

(Continued)

*Primary Examiner* — Michelle M Entezari
(74) *Attorney, Agent, or Firm* — Nicholas D. Bowman

(57) ABSTRACT

An object detection algorithm is selectively applied to frames in a video. A frame in the video is analyzed using a set of neural networks of the object detection algorithm to detect a location of an object in the frame and predict a bounding box for the object in the frame. A magnitude of a delta between the frame and a second frame is determined. The magnitude of the delta is determined based on a difference between the two frames in values of at least one parameter of their respective sets of pixels. Responsive to the magnitude of the delta being less than a threshold, a new bounding box is predicted for the object in the second frame without analyzing the second frame using the set of neural networks.

17 Claims, 9 Drawing Sheets

(56) References Cited

U.S. PATENT DOCUMENTS

| | | | | |
|---|---|---|---|---|
| 9,020,190 | B2* | 4/2015 | Fan | G06K 9/6277 |
| | | | | 382/103 |
| 10,223,611 | B1* | 3/2019 | Price | G06K 9/4628 |
| 10,269,125 | B1* | 4/2019 | Kim | G06K 9/00718 |
| 10,878,284 | B2* | 12/2020 | Shen | G06T 11/60 |
| 10,891,488 | B2* | 1/2021 | Khosla | G06N 3/08 |
| 2008/0094479 | A1* | 4/2008 | Yost | H04N 5/23254 |
| | | | | 348/208.99 |
| 2014/0002742 | A1* | 1/2014 | Chamaret | H04N 5/14 |
| | | | | 348/571 |
| 2018/0114082 | A1* | 4/2018 | Choi | G06T 7/20 |
| 2019/0042850 | A1* | 2/2019 | Jones | G06K 9/00711 |
| 2019/0065861 | A1* | 2/2019 | Savvides | G06K 9/00979 |
| 2019/0362155 | A1* | 11/2019 | Croxford | G06K 9/66 |
| 2020/0193609 | A1* | 6/2020 | Dharur | G06T 7/11 |
| 2021/0090284 | A1* | 3/2021 | Ning | G06K 9/6273 |
| 2021/0209734 | A1* | 7/2021 | Simhadri | G06T 7/248 |

OTHER PUBLICATIONS

Alefs, Bram, and David Schreiber. "Accurate speed measurement from vehicle trajectories using adaboost detection and robust template tracking." In 2007 IEEE Intelligent Transportation Systems Conference, pp. 405-412. IEEE, 2007. (Year: 2007).*

He, Y., Zhu, C., Wang, J., Sawides, M., & Zhang, X. (2019). Bounding box regression with uncertainty for accurate object detection. In Proceedings of the IEEE/CVF Conference on Computer Vision and Pattern Recognition (pp. 2888-2897). (Year: 2019).*

Unknown, "YOLO: Real-Time Object Detection", printed Feb. 6, 2020, 5 pages https://pjreddie.com/darknet/yolo/.

Alvar et al., "MV-YOLO: Motion Vector-aided Tracking by Semantic Object Detection", Jun. 15, 2018, 6 pages.

Porikli et al., "Object Tracking in Low-Frame-Rate Video", Proceedings of SPIE—The International Society for Dptical Engineering, Mar. 2005, 12 pages.

Zhang et al., "Deep Reinforcement Learning for Visual Object Tracking in Videos", Jan. 31, 2017, 11 pages.

Peng, "Performance and Accuracy Analysis in Object Detection", Date of Delivery: Nov. 26, 2019, Published Date Dec. 3, 2019, 32 pages.

Unknown, ImageAI: Video Object Detection, Tracking and Analysis, Published Date: Aug. 9, 2019, 16 pages.

Lao et al., "Minimum Delay Object Detection From Video", Computer Science, Engineering, Published in ICCV 2019, Aug. 29, 2019, 10 pages.

Kumar et al., "Importance of Statistical Measures in Digital Image Processing", International Journal of Emerging Technology and Advanced Engineering, vol. 2, Issue 8, Aug. 2012, pp. 56-62.

* cited by examiner

[Parsed_showinfo_2 @ 0x7fefd6710c80] n: 10 pts: 230230 pts_time:7.67433 pos: 904523 fmt:yuvj420p sar:32/27 s:480x320 i:P iskey:0 type:I checksum:A865CF0B plane_checksum:[756DC687 2C810465 DB3F041F] mean:[56 128 128] stdev:[67.3 0.0 0.1]

[Parsed_showinfo_2 @ 0x7fefd6710c80] n: 11 pts: 250250 pts_time:8.34167 pos: 961343 fmt:yuvj420p sar:32/27 s:480x320 i:P iskey:1 type:I checksum:16BA95C8 plane_checksum:[121F8CFE 2C810465 2C810465] mean:[48 128 128] stdev:[65.3 0.0 0.0]

[Parsed_showinfo_2 @ 0x7fefd6710c80] n: 12 pts: 351351 pts_time:11.7117 pos: 1462794 fmt:yuvj420p sar:32/27 s:480x320 i:P iskey:1 type:I checksum:83E664E5 plane_checksum:[91F2E635 723BC09A BAF1BDF8] mean:[43 121 136] stdev:[37.7 6.2 5.8]

FIG. 6

NON-RESOURCE-INTENSIVE OBJECT DETECTION

BACKGROUND

The present disclosure relates generally to the field of data processing, and, more particularly, to the detection and tracking of objects in video frames.

Object detection has become increasingly important in a variety of technology fields in recent years, as the ability to track objects across video frames has become increasingly significant in many applications involving security and artificial intelligence (e.g., collision avoidance in self-driving vehicles).

SUMMARY

Embodiments of the present disclosure include a method of selectively applying an object detection algorithm to frames in a video. As part of the method, a frame in the video is analyzed using a set of neural networks of the object detection algorithm to detect a location of an object in the frame and predict a bounding box for the object in the frame. The method further includes a magnitude of a delta between the frame and a second frame being determined. The magnitude of the delta is determined based on a difference between the two frames in values of at least one parameter of their respective sets of pixels. The method further includes, responsive to the magnitude of the delta being less than a threshold, a new bounding box being predicted for the object in the second frame without analyzing the second frame using the set of neural networks.

Embodiments of the present disclosure further include a computer program product for selectively applying an object detection algorithm to frames in a video. The computer program product comprises at least one computer readable storage medium. The at least one computer readable storage medium has program instructions embodied therewith that are configured, when executed by at least one computer, to cause the at least one computer to perform a method. As part of the method, a frame in the video is analyzed using the object detection algorithm to detect an object in the frame and predict a bounding box for the object. The method further includes codec metadata values derived during encoding of the video being compared to determine a magnitude of a delta of at least one parameter of the pixels between the frame and a second frame. The method further includes, responsive to the magnitude of the delta being less than a threshold, a new bounding box being predicted for the object in the second frame without analyzing the second frame using the object detection algorithm.

Embodiments of the present disclosure further include a system for selectively applying an object detection algorithm to frames in a video. The system includes at least one computer readable storage medium and at least one processor in communication with the at least one computer readable storage medium. The at least one processor is configured to obtain instructions from the at least one computer readable storage medium that cause the at least one processor to perform a method. As part of the method, a frame in the video is analyzed using a set of neural networks of the object detection algorithm to detect a location of an object in the frame and predict a bounding box for the object in the frame. The method further includes a magnitude of a delta between the frame and a second frame being determined. The magnitude of the delta is determined based on a difference between the two frames in values of at least one parameter of their respective sets of pixels. The method further includes, responsive to the magnitude of the delta being less than a threshold, a new bounding box being predicted for the object in the second frame without analyzing the second frame using the set of neural networks.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 6 illustrates an example snippet 650 of codec metadata that may be used in determining whether to selectively apply an object detection algorithm, in accordance with embodiments of the present disclosure.

Figure 1:
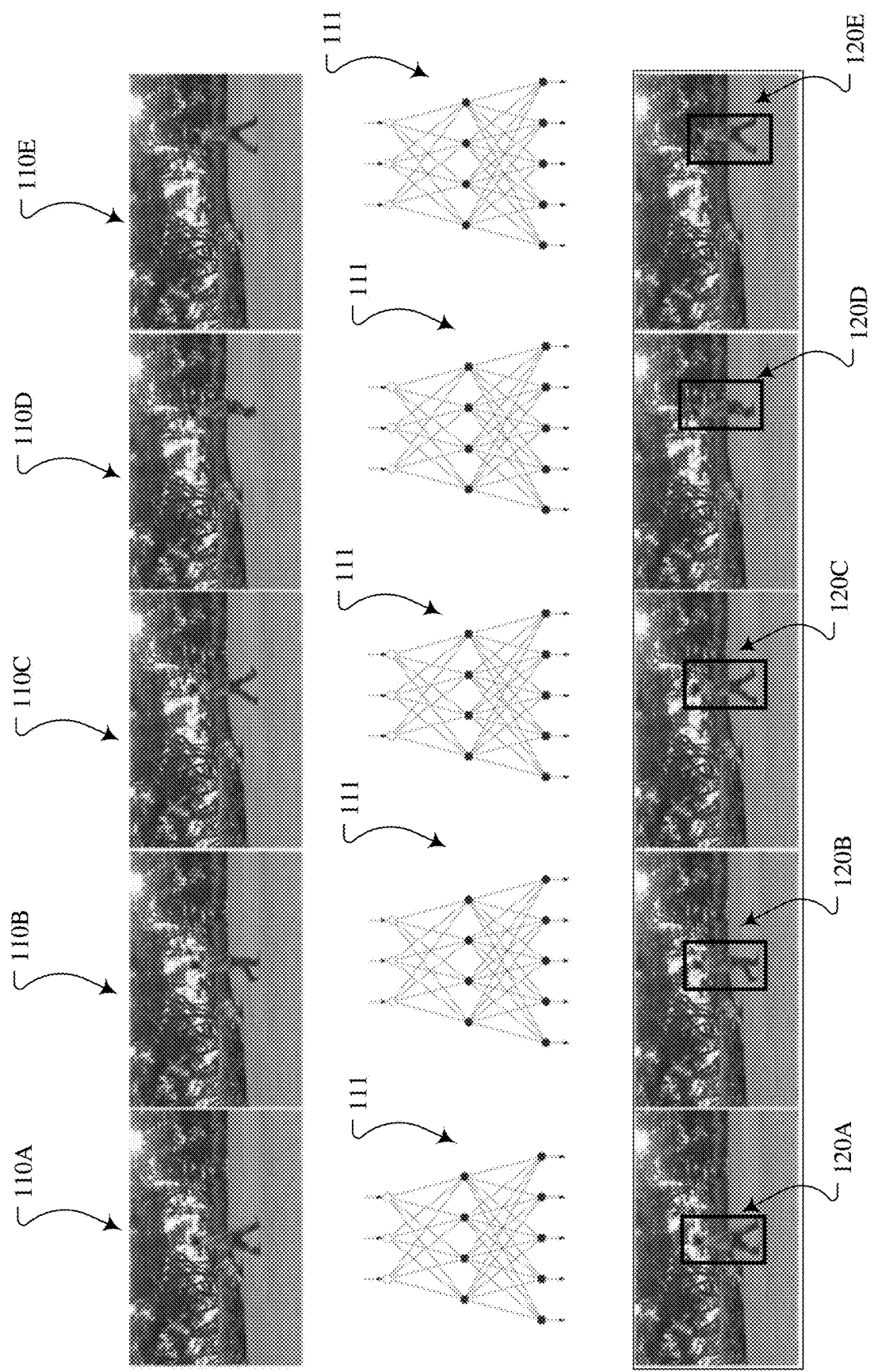
FIG. 1 illustrates a block diagram depicting an example of applying an object detection algorithm to each frame 110A-110E in a video in order to locate an object and predict a bounding box 120A-120E for the object in each frame.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to the detection and tracking of objects in video frames. While the present disclosure is not necessarily limited to such applications, various aspects of the disclosure may be appreciated through a discussion of various examples using this context.

As used herein, an object detection algorithm may refer to an algorithm that is used by a computer to detect instances of objects from a particular object class (e.g., human, dog, face) within images. Examples of object detection algorithms include Regional Convolutional Neural Network ("R-CNN"), Fast R-CNN, Faster R-CNN, Single Shot Detector ("SSD"), You Only Look Once Version 1 ("YOLOv1"), YOLOv2, and YOLOv3 (or other algorithms following the YOLO model). These algorithms generally work by using one or more neural networks, such as convolutional neural networks, that are trained on data sets of training images. The trained neural network(s) (e.g., image classifier) is then feed an image as an input and outputs a prediction of a bounding box and class label for each object of interest in the image. As used herein, a bounding box may refer to a set of coordinates of a rectangular box that fully encloses on object of interest. A smaller bounding box for a given object is generally preferred as it more precisely indicates the location of the object in the image, as compared to a larger bounding box for the same object. In the process of predicting a bounding box, object detection algorithms may rely on a technique referred to as a sliding window. In the sliding window technique, a window moves across the image, and, at various intervals, the region within the window is analyzed using an image classifier to determine if it contains an object of interest.

Referring now to the figures, shown in FIG. 1 is a block diagram depicting an example of applying an object detection algorithm to each frame 110A-110E in a video in order to locate an object and predict a bounding box 120A-120E for the object in each frame. As shown, a series of frames 110A-110E of a video depict a moving object (in this instance, a walking person) that is to be tracked across the frames. In this example, the object detection algorithm is applied to each frame. This may include, for example, the algorithm using a sliding window technique and/or a set of (i.e., one or more) neural networks 111 (which may be a CNN and/or image classifier) on each frame to locate (e.g., detect) the person in the frame and to predict a corresponding bounding box 120A-120E for the person in the frame.

Object detection algorithms that work in the manner described above and illustrated in FIG. 1 may be very useful in many fields. However, in some situations, these methods are simply too costly in terms of resource usage and/or time. For example, in mobile devices the significant resources required to run the algorithm on each frame may require large amounts of battery or other resources (e.g., CPU, memory) that a mobile device will have in relatively short supply. The situation with Internet of Things ("IoT") devices may be even worse as the aspects of these devices that make them promising candidates for use in object detection (e.g., being small, lightweight, and inexpensive) makes them even more sensitive to resource management concerns. Further, in some situations these methods may require a significant amount of time to process each frame such that the overall frames per second rate may be too slow for the methods to be used in analyzing real-time video streams.

Some embodiments of the disclosure may overcome these resource limitations by only selectively applying the object detection algorithm to frames in a video, rather than applying the objection detection algorithm to every frame. This means that less resources are used in tracking a moving object through the video because the objection detection algorithm is run fewer times (rather than for every frame), which may save significant resources, such as CPU cycles and memory space. This is particularly important in situations where resources are limited. In addition, this may also increase the rate at which a computer can process frames so as to keep appropriate pace in a real-time video streaming scenario.

Aspects of the disclosure further recognize an additional challenge associated with this selective application of an object detection algorithm. Specifically, there is a challenge in knowing which of the frames can go unprocessed by the object detection algorithm without significant loss in the precision of bounding boxes predicted for an object in those unprocessed frames. If inappropriate frames in a video are selected for bypassing the algorithm, then there may be a significant risk that bounding boxes of unacceptably low precision are predicted for much of the video.

In some embodiments, these challenges are overcome by using information about the pixels in the frames themselves to select which frames can be skipped over by the object detection algorithm. This information may be obtained by leveraging codec metadata that is received with the video frames (e.g., in an MP4 container format). Specifically, before video content is transferred from one computer to another (e.g., via Internet streaming), the frames of the video are typically compressed and/or encrypted by a codec in a process referred to as encoding. The encoded video frames are stored in a container that is sent to the recipient computer. Upon receipt, this recipient computer uses a corresponding codec to decode (that is, decrypt and/or decompress) the video frames. Once decoded, the recipient is able to use the video (e.g., for rendering and playback to a viewer or for performing object detection). Included with the video frames in the container is a significant amount of codec metadata that is generated (e.g., derived) by the encoding codec during the encoding process. This codec metadata is often critical for the decoding codec to process the received video frames in an efficient manner (or at all) as it provides important details about the encoded video frames. This may be particularly true in situations where reference frames (e.g., I-frames) are used and other frames (e.g., P-frames) are described in a received container only with reference to a reference frame and a corresponding delta indicating the difference between that frame and the reference frame.

Rather than just using codec metadata for its originally intended purpose of decoding video frames and then discarding it, embodiments of the disclosure leverage this codec metadata to aid in determining which frames can be skipped over by the object detection algorithm. Specifically, in some embodiments, an object detection algorithm is applied to a first frame in a video to locate an object of interest in the first frame and to predict a bounding box for the object in that frame. Next, the codec metadata of the first frame is compared to the corresponding codec metadata for a new frame in the video to which the object detection algorithm has not yet been applied. Based on the codec metadata comparison, a magnitude of a delta between the two frames is determined. This delta may be a measure of the difference between the frames in terms of the parameters of their pixels (e.g., the difference between the mean Red Green Blue ("RGB") values of the pixels in the frames). If the delta is below a threshold (e.g., because the two frames are similar), then the object detection algorithm does not need to be applied to the new frame and the bounding box for the object can be predicted in the new frame based on (i) the location of the predicted bounding box in the first frame and (ii) the magnitude of the delta. Variants on these embodiments are also possible. For example, in some embodiments the relevant delta may be calculated by comparing the corresponding pixels in the first frame and the new frame, such as by using matrix subtraction, to determine how different the two frames are. In some embodiments, when there is a below-threshold delta, the object will effectively be assumed to be in the same location in both frames and only the bounding boxes need to be different between the frames.

These manners of predicting the bounding box in the new frame may be less resource intensive than the alternative of applying the object detection algorithm to the new frame. Ultimately, the repeated application of these steps to the frames in the video may result in a significant decrease in the number of times that the object detection algorithm needs to be applied and may reduce overall resource usage correspondingly.

Figure 2:
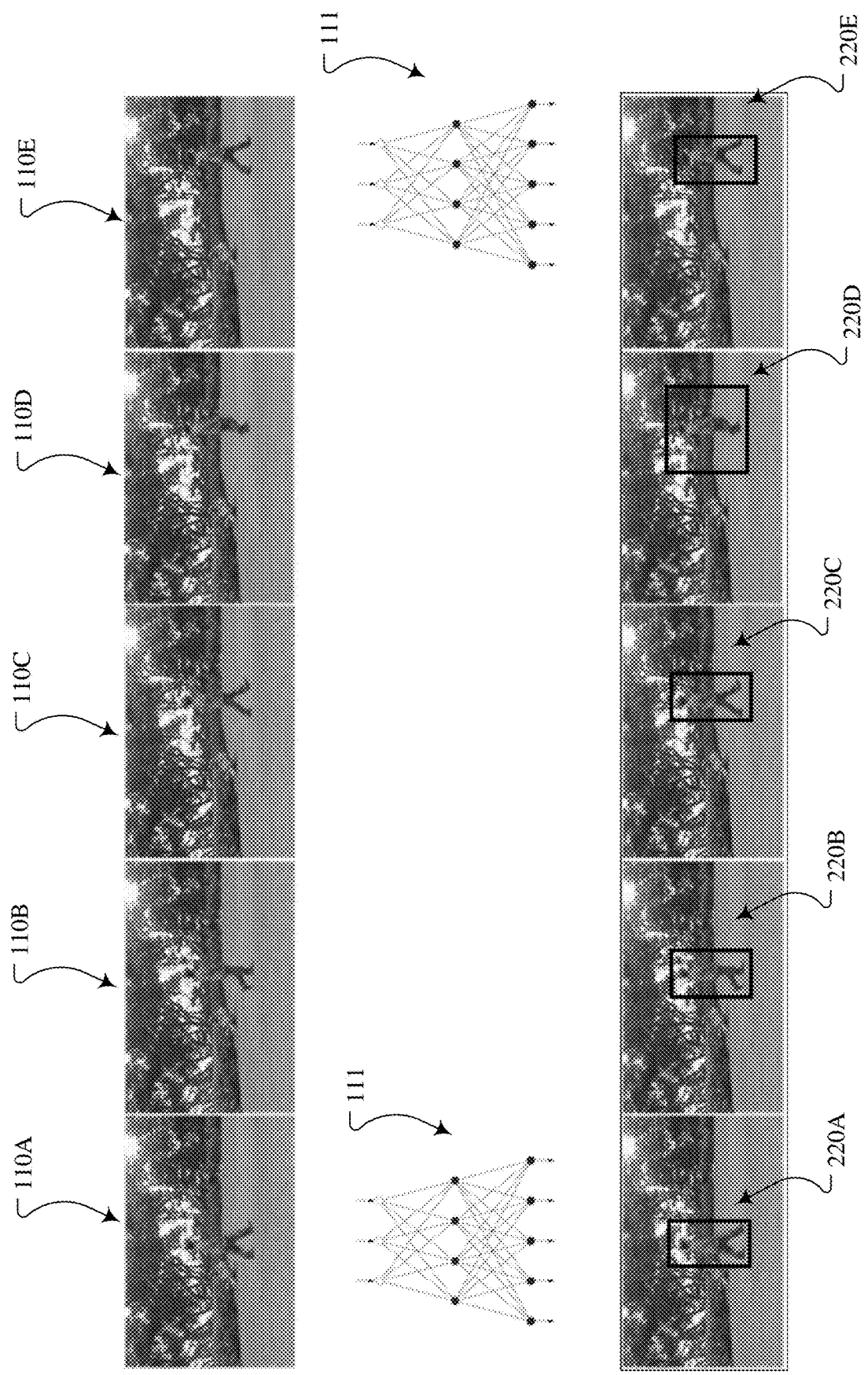
FIG. 2 illustrates a block diagram depicting a different example involving selectively applying an object detection algorithm to frames 110A-110E in the video such that a corresponding one of bounding boxes 220A-220E is predicted in each frame without a need to apply the object detection algorithm to all of the frames, in accordance with embodiments of the present disclosure.

Referring now to FIG. 2, shown is a block diagram depicting a different example (than the one shown in FIG. 1) involving selectively applying an object detection algorithm to frames 110A-110E in the video such that a corresponding one of bounding boxes 220A-220E is predicted in each frame without a need to apply the object detection algorithm to all of the frames, in accordance with embodiments of the present disclosure. As shown, the steps employed in predicting the bounding box 220A in frame 110A may be substantially similar to the steps used to predict the corresponding bounding box 120A in FIG. 1. Specifically, the object detection algorithm, including, for example, the sliding window technique and the image classifier (represented by the set of neural networks 111), is applied to the frame 110A. Based on that application, the person is located in the frame, and the bounding box 220A is predicted.

This is contrasted with frames 110B-110D, which are treated significantly differently in FIGS. 1 and 2. Specifically, in FIG. 2, information about frames 110B-110D (e.g., codec metadata) are each compared to corresponding information about frame 110A in order to determine the magnitude of the delta between each of the frames 110B-110D and 110A. In each depicted instance, the magnitudes are less than a threshold. As a result, each of the bounding boxes 220B-220D are predicted based the bounding box 220A, and potentially their corresponding frame deltas, without applying the object detection algorithm (as represented by neural network 111) to any of the frames 110B-110D.

Next in FIG. 2, information about frame 110E is compared to corresponding information about frame 110A, to determine the magnitude of the delta between frame 110A and 110E. In this instance (as contrasted with the comparisons relevant to frames 110B-110D), the delta is calculated as exceeding the threshold (e.g., because the difference between frames 110A and 110E is too great for the bounding box 220A to be a reasonable basis for predicting the bounding box 220E). As a result, the object detection algorithm, including, for example, the sliding window technique and the image classifier (represented by the set of neural networks 111), is applied to the frame 110E to predict the bounding box 220E for the walking person in that frame.

As shown, the differences and similarities between the steps employed in predicting the bounding boxes 120A-120E, in FIG. 1, and the corresponding bounding boxes 220A-220E, in FIG. 2, yields corresponding similarities and differences between the bounding boxes themselves. Specifically, because frames 110A and 110B both undergo the objection detection algorithm in both figures, bounding boxes 120A and 220A and bounding boxes 120B and 220B will likely have identical dimensions. This is contrasted with bounding boxes 220B-220D of FIG. 2, which, being predicted without the benefit of the object detection algorithm, may have different dimensions (e.g., be larger than) their corresponding bounding boxes 120B-120D of FIG. 1. In some situations, the size of the delta may impact the size of the predicted bounding box. For example, due to the relatively large (but still less than threshold) delta between frames 110A and 110D, the bounding box 220D is depicted as larger than its corresponding bounding box 120D to represent a lesser degree of precision.

Ultimately, the steps employed in predicting bounding boxes 220A-220E may require less resources as compared to predicting the corresponding bounding boxes 120A-120E, as the object detection algorithm is only applied two (rather than five times) in FIG. 2. Over the course of an entire video, which may consist of many thousand frames, these resource savings may be significant.

Figure 3A:
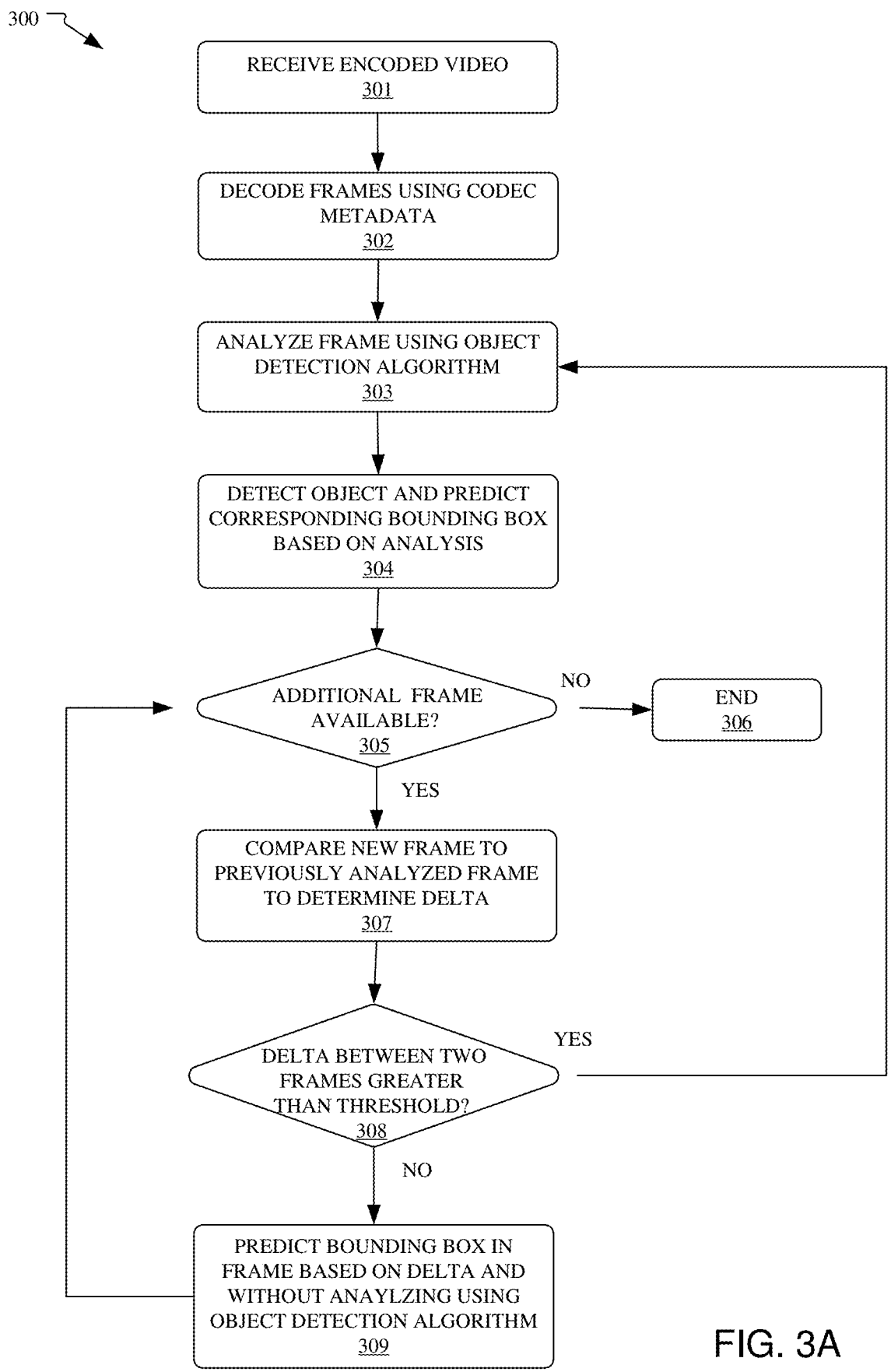
FIG. 3A illustrates a flow diagram of a method 300 for selectively applying an object detection algorithm to frames in a video, in accordance with embodiments of the present disclosure.

Referring now to FIG. 3A, shown is a flow diagram of a method 300 for selectively applying an object detection algorithm to frames in a video, in accordance with embodiments. In some embodiments, operations of the method 300 may be performed on a processor of a computer (e.g., computer system 701 of FIG. 7). The method 300 begins at operation 301, wherein an encoded video is received. In some embodiments, the video may be received in parts or continuously (rather than all at once), because of the nature of the delivery medium (e.g., via streaming over the Internet) and/or because the video is a live stream received in real-time or near-real time. The video frames may be received in a container file.

Per operation 302, the received frames of the video are decoded (e.g., unencrypted, decompressed) using codec metadata that was derived by a corresponding codec and included in the container file when the frames were encoded. Examples of codec metadata include information about how the frames were compressed/encrypted and information about the values of pixels in the frames either individually (e.g., individual pixel RGB values) or collectively (e.g., mean RGB values for an entire frame).

Per operation 303, a frame is selected and is analyzed using an object detection algorithm. Per operation 304, and based on the analysis, an object is detected and a corresponding bounding box for the object is predicted in the frame. In some embodiments, this analysis may include the algorithm using a sliding window technique and/or an image classifier (made up of a set of neural networks) on the selected frame to locate (e.g., detect) an object in the frame, determine a class of the object, and to predict a corresponding bounding box for the object if it is determined to be of a relevant class.

Per operation 305, a determination is made if there are additional frames available that need to be reviewed for relevant objects. If not, then the method 300 ends, per operation 306, and the processor awaits the receipt of additional frames (either in the same video or a different video). If, however, a determination is made in operation 305 that there are additional frames available, then, per operation 307, a new frame is selected and compared to a previously analyzed frame to determine the magnitude of a delta between the frames.

In some embodiments, the previously analyzed frame to which the new frame is compared in operation 307 does not have to be the frame that immediately proceeded the new frame in the video sequence. For example, the previously analyzed frame may be significantly before the new frame in the sequence or after the new frame in the sequence. For another example, the previously analyzed frame may be a reference frame (e.g., I-frame) that is referenced by the new frame. Further in some embodiments, the relevant previously analyzed frame may only be used for the comparison if that frame was analyzed using all or portions of the object detection algorithm (e.g., the sliding window or the image classifier/CNN such that frames upon which boundary boxes where predicted without using these features are not used for the comparison of operation 307. Further, more specific embodiments of operation 307 are provided elsewhere herein (e.g., in reference to FIGS. 3B and 3C).

Per operation 308, the delta determined in operation 307 is compared to a threshold. In some embodiments, the threshold may be set by a user or the processor and may be adjustable. Factors used in selecting the desired threshold may take into account a balance between a need for precision (which would tend toward smaller thresholds, relatively more applications of the object detection algorithm, and relatively smaller bounding boxes) and a need for speed or resource conservation (which would tend toward larger thresholds, relatively fewer applications of the object detection algorithm, and relatively larger bounding boxes). In some embodiments, the threshold may be expressed as a percentage difference between the compared frames in terms of one or more parameters (e.g., 10% difference in mean RGB values).

If, per operation 308, the determined delta is greater than the threshold, then the method loops back to operation 303, so that the frame can be analyzed using the object detection algorithm and a bounding box can be predicted for the object in the frame based on that analysis (per operation 304). In some embodiments, this may occur because the compared previously analyzed frame is too dissimilar to the new frame for the bounding box of the previously analyzed frame to be a reasonable basis for predicting the bounding box of the new frame.

If, however, the determined delta is less than the threshold, per operation 308, then, per operation 309, the bounding box is predicted in the new frame without that frame being analyzed using the object detection algorithm or at least without that frame being analyzed using specific portions of the object detection algorithm (e.g., the image classifier, the CNN, or the sliding window technique). In some embodiments, the predicted bounding box may have the same dimensions (and be located in the same relative location) as the corresponding bounding box in the previously analyzed frame. This may be likely to occur in situations where the delta between the frames is very small. In other embodiments, the bounding box in the new frame may have a same center as and be larger than the bounding box in the previously identified frame. The relative size of the new bounding box may be proportional to the magnitude of the delta. More specifically, the size of the new bounding box may be larger than the previously identified bounding box by an amount that is proportional (directly or otherwise) to the magnitude of the delta. For example, deltas of 5%, 10%, and 25% may produce proportionally larger bounding boxes than are 5%, 10%, and 25% larger in area, respectively, than the boundary boxes upon which they are based. For another example, deltas of 5%, 10%, and 25% may produce proportionally larger bounding boxes than are 10.25% (1.05^2), 21% (1.10^2), and 56.25% (1.25^2) larger in area, respectively, than the boundary boxes upon which they are based.

After operation 309, the method loops back to operation 305, where a frame (if available) is selected again and the method 300 continues to process frames until the processing of the video is complete.

While example embodiments are described with reference to FIG. 3A, many variants and extensions on these examples are contemplated. For example, in some embodiments multiple objects may be tracked across a series of frames (e.g., where two or more objects of interest appear in each frame) using the same principles described herein and by selectively applying an object detection algorithm to detect each of the objects of interest in each frame and to predict corresponding bounding boxes for each object in each frame. For another example, in some embodiments, deltas between frames may take into account multiple sections of a frame that are different as compared to a previously analyzed frame (e.g., where there is moving bird in one corner of a frame and a moving person in another corner of the frame, there may be two distinct areas where there are differences between this frame and the one to which it is compared, and these differences may be added (or otherwise combined) in determining the total delta for the frame).

Figure 3B:
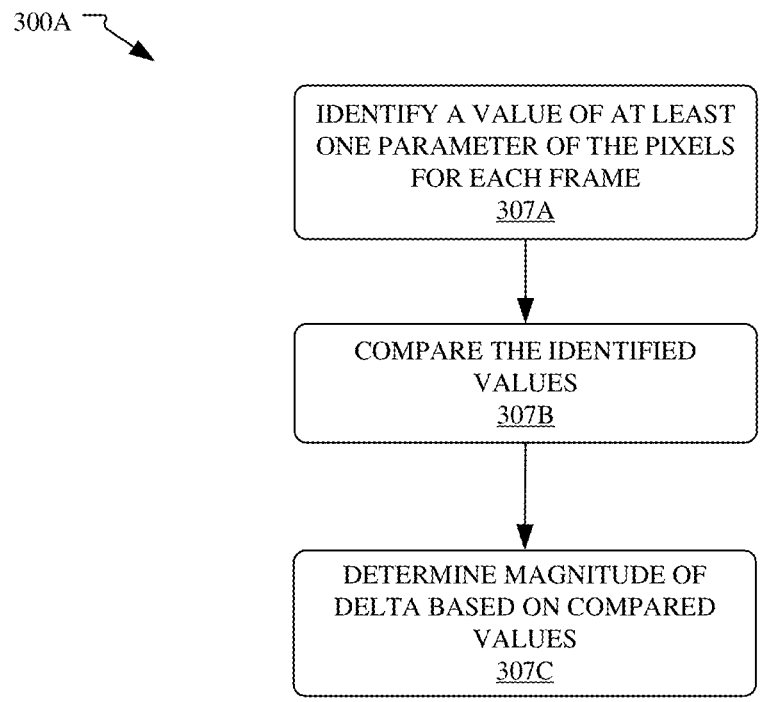
FIG. 3B illustrates a flow diagram of a first method 300A for comparing two frames to determine a delta between them, in accordance with embodiments of the present disclosure.

Referring now to FIG. 3B, shown is a flow diagram of a first method 300A for comparing two frames to determine a delta between them, in accordance with embodiments. Method 300A, which may be used as operation 307 in method 300, begins with operation 307A, wherein a value of at least one parameter of the pixels in the frame is identified for each frame. In some embodiments, the relevant parameter may be a statistical measure of the pixels in the frame as a whole. Examples of such parameters include mean, median, mode, standard deviation, and variance. More specific examples of such parameters are the mean RGB values or other mean values of color or brightness (luminance) for the pixels in the frame. In other embodiments, the relevant parameter of the pixels may be individual values for each pixel in the frame (e.g., in terms of RGB values), rather than the pixels in each frame as a whole. In some embodiments, the values of the relevant parameter may be identified from the codec metadata without a need to analyze the individual pixels of the frames. In other embodiments, the values may be identified by analyzing the individual pixels or groups of pixels within the frames.

Per operation 307B, the identified values for the relevant parameters are compared to each other for the frames. This may include, for example, comparing the mean RGB values of the one frame to the mean RGB values of the other frame. In another example, this may include the values of corresponding pixels being compared to each other (e.g., RGB values of pixel 1 of frame 1 being compared to RGB values of pixel 1 of frame 2, RGB values of pixel 2 of frame 1 being compared to RGB values of pixel 2 of frame 2, etc.).

Per operation 307C, the magnitude of the relevant delta between the frames is determined (e.g., calculated) based on the compared values. This delta may take a variety of forms in various embodiments (e.g., one or more absolute values, a percentage difference between the frames in terms of the relevant values). In some embodiments, the delta may be a single value. In other embodiments, the delta may be combination of values (e.g., a percentage difference in mean R values, a percentage difference in mean G values, and a percentage difference in mean B values).

Figure 3C:
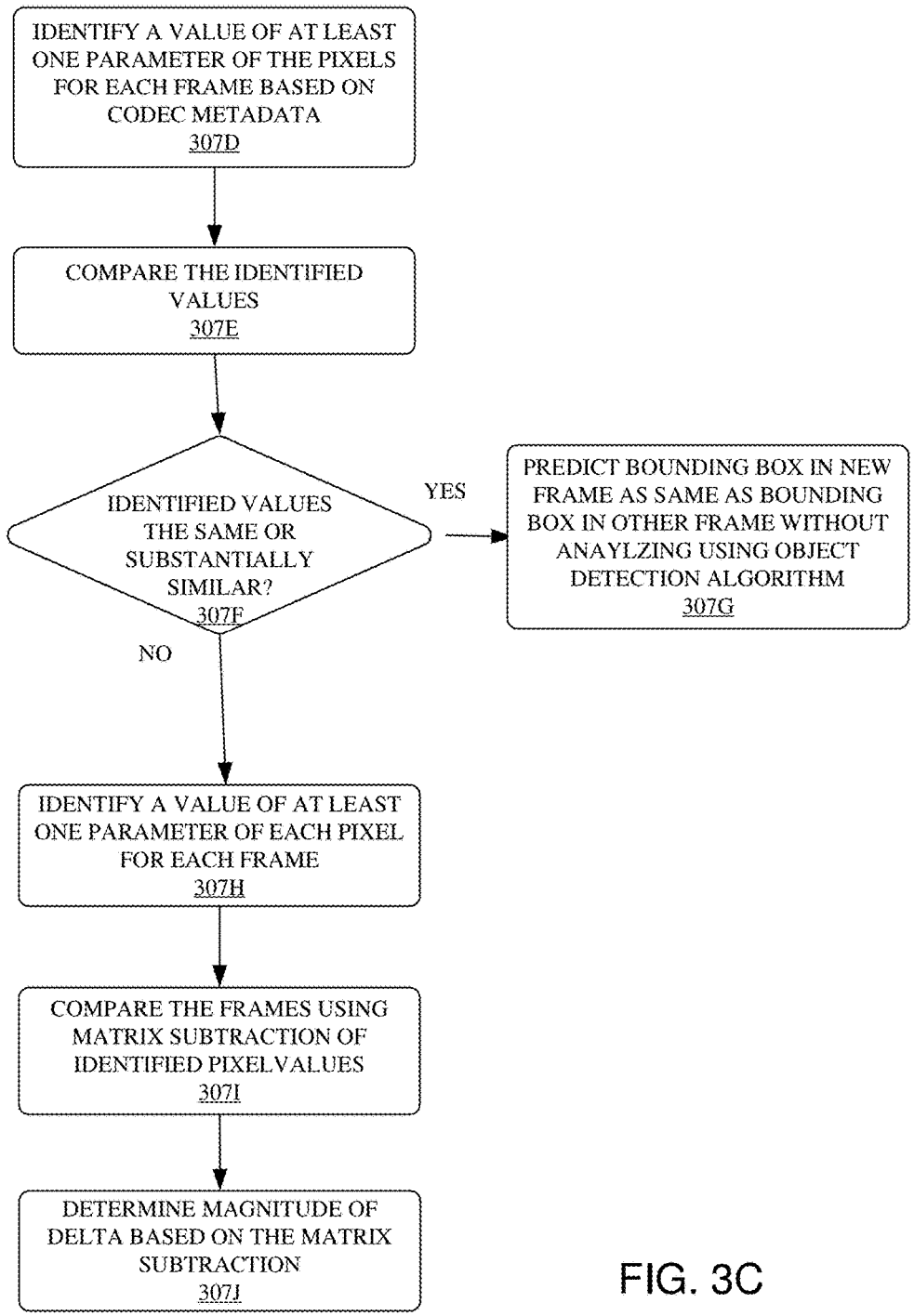
FIG. 3C illustrates a flow diagram of a second, alternative method 300B for comparing two frames to determine a delta between them, in accordance with embodiments of the present disclosure.

Referring now to FIG. 3C, shown is a flow diagram of a second, alternative method 300B for comparing two frames to determine a delta between them, in accordance with embodiments. Method 300B, which may be used as operation 307 in method 300, begins with operation 307D, wherein a value of at least one parameter of the pixels in the frame is identified for each frame based on codec metadata included with the frames.

Per operation 307E, the identified values are compared with each other. And, per operation 307F, a determination is made as to whether the compared values are the same or substantially similar to each other. In some embodiments, this determination may be made based on a threshold that is smaller than (or otherwise more sensitive to differences between the frames than) a corresponding delta threshold. For example, when a threshold used in operation 307F is 0.1%, 0.5%, 1%, or 5%, then a corresponding delta threshold may be 1%, 5%, 10%, or 20%, respectively. In some embodiments, this comparison may be a preliminary step before the determination of the delta between the frames in order to decide whether that delta even needs to be calculated.

If, per operation 307F, the frames are determined to be the same or substantially similar in terms of the compared values (e.g., the difference between them is below a threshold), then, per operation 307G, a bounding box is predicted in the new frame that is the same as (e.g., same size and location as) the corresponding bounding box in the compared frame without the object detection algorithm needing to analyze the new frame. In other embodiments, the predicted bounding box is larger than the corresponding bounding box (e.g., proportional to the calculated difference between the two frames).

If, however, a determination is made in operation 307F that the frames are not the same or substantially similar (e.g., the difference between them exceeds a threshold), then, per operation 307H, a value of at least one parameter of each pixel in each frame is identified. In some embodiments, this determination in operation 307F may signify that the difference between the frames is enough such that further analysis should be done before deciding whether to process the new frame with the object detection algorithm. In some embodiments, the values identified in 307H are similar to the values identified in operation 307D with the main difference being that the values here are more granular than the corresponding values identified in operation 307D (e.g., identifying individual pixel RGB values v. identifying mean RGB values for whole frames). In other embodiments, the values for operation 307H and 307D may be identified for very different parameters from each other.

Per operation 307I, the frames are compared using the values identified in operation 307H. In some embodiments, this comparison involves matrix subtraction of the values for corresponding pixels between the frames. For example, this may include converting the RGB values for each pixel to a single greyscale value (e.g., a number between 0 and 255) for each pixel and then comparing the corresponding greyscale values via the matrix subtraction.

Per operation 307J, the magnitude of the relevant delta between the frames is determined (e.g., calculated) based on the matrix subtraction (or other comparison made in operation 307I). This delta may take a variety of forms in various embodiments (e.g., one or more absolute values, a percentage difference between the frames in terms of the relevant values). In some embodiments, the delta may be a single value (e.g., based on determining an absolute value for each value in the matrix resulting from the matrix subtraction and adding those absolute values together). In other embodiments, the delta may be a combination of values.

Figure 4:
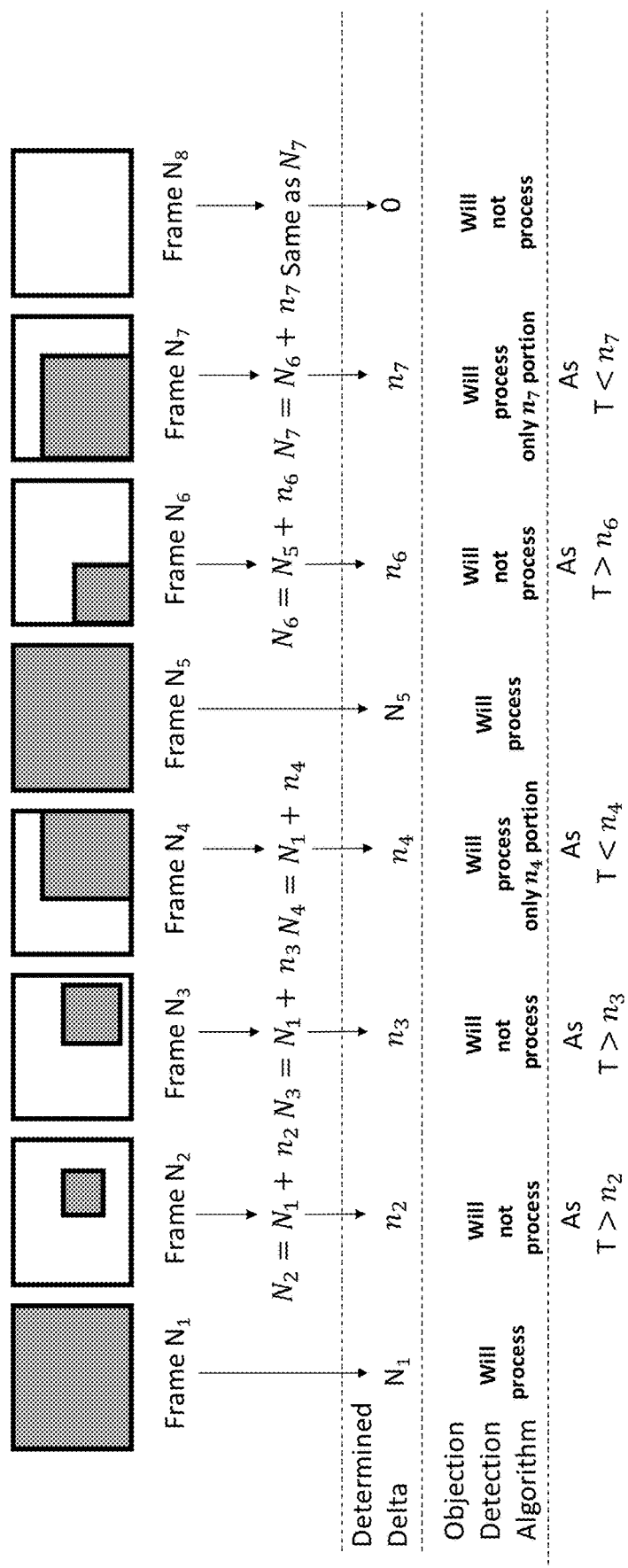
FIG. 4 illustrates a chart depicting the impact of various deltas between frames in series on the selective application of an object detection algorithm to particular frames, in accordance with embodiments of the present disclosure.

Referring now to FIG. 4, shown is a chart depicting the impact of various deltas between frames in series on the selective application of an object detection algorithm to particular frames, in accordance with embodiments. As shown, the video includes eight frames (Frame $N_1$ to Frame $N_8$) in series. As the frames are processed, a delta is determined for each frame. This delta may be determined, for example, using any variants of embodiments of operation 307 of FIG. 3A (including those described in methods 300A and 300B). In some embodiments, the delta may be determined based in large part (or wholly) by using codec metadata included with the frames. In some embodiments, the deltas may be calculated based on (or be the same as) values that are used to show the differences between the analyzed frame and the frame which that frame references (e.g., in video formats that use keyframes). For example, assuming Frame $N_1$ is a keyframe and Frame $N_2$ references that keyframe, then the codec metadata could include the entire value $N_1$ as the delta for Frame $N_1$ because it does not reference any other frame, and the codec metadata could include only the difference between $N_1$ and $N_2$, which is $n_2$, (rather than the entire $N_2$) as the delta for Frame $N_2$. Such situations may have the added advantage of having deltas that are easy to identify (e.g., because they are directly included by an encoding codec in a container with the frames).

In the example of FIG. 4, only Frames $N_1$ and $N_5$ are fully processed using the object detection algorithm (e.g., because their deltas exceed a threshold). This may include, for example, analyzing each of Frame $N_1$ and $N_5$ with the object detection algorithm (per operation 303 of FIG. 3A) and detecting an object and predicting a corresponding bounding box in each frame based on that analysis (per operation 304 of FIG. 3A). On the other end of the processing spectrum, Frames $N_2$, $N_3$, $N_6$, and $N_8$ are not analyzed at all using the object detection algorithm because their corresponding deltas are lower than the threshold (T). This may include, for example, each of Frames $N_2$, $N_3$, $N_6$, and $N_8$ having a bounding box predicted within it, per operation 309 of FIG. 3A, that is positioned and sized based on the size of its delta and the size and position of the corresponding bounding box in its reference frame (e.g., with Frame $N_3$ having a bounding box predicted based on the corresponding bounding box in Frame $N_1$ and the size of its delta $n_3$).

Also described in FIG. 4 is the concept of partial processing of certain frames with the object detection algorithm based on those frames having deltas that are larger than the threshold (T) but which frames are still similar enough to the frames that they reference to justify only partial processing. This similarity determination may be made, for example, using a second threshold, which is larger than the threshold T, to which the frame's deltas are also compared. In some embodiments, this partial processing may include only those sections of the frame that are different (or significantly different) from its reference frame being analyzed using the object detection algorithm, with the rest of the frame not being analyzed using all or portions of the object detection algorithm (e.g., the rest of the frame not being processed with the sliding window technique and the CNN). This partial processing may save resources and time as compared to full processing of the entire frame. In some embodiments, the results of the partial processing are used in addition to the size (e.g., magnitude) of the delta and the size and location of the corresponding bounding box in the reference frame to predict the bounding box in the new frame. Examples of frames in FIG. 4 that undergo partial processing are Frames $N_4$ and $N_7$.

Figure 5:
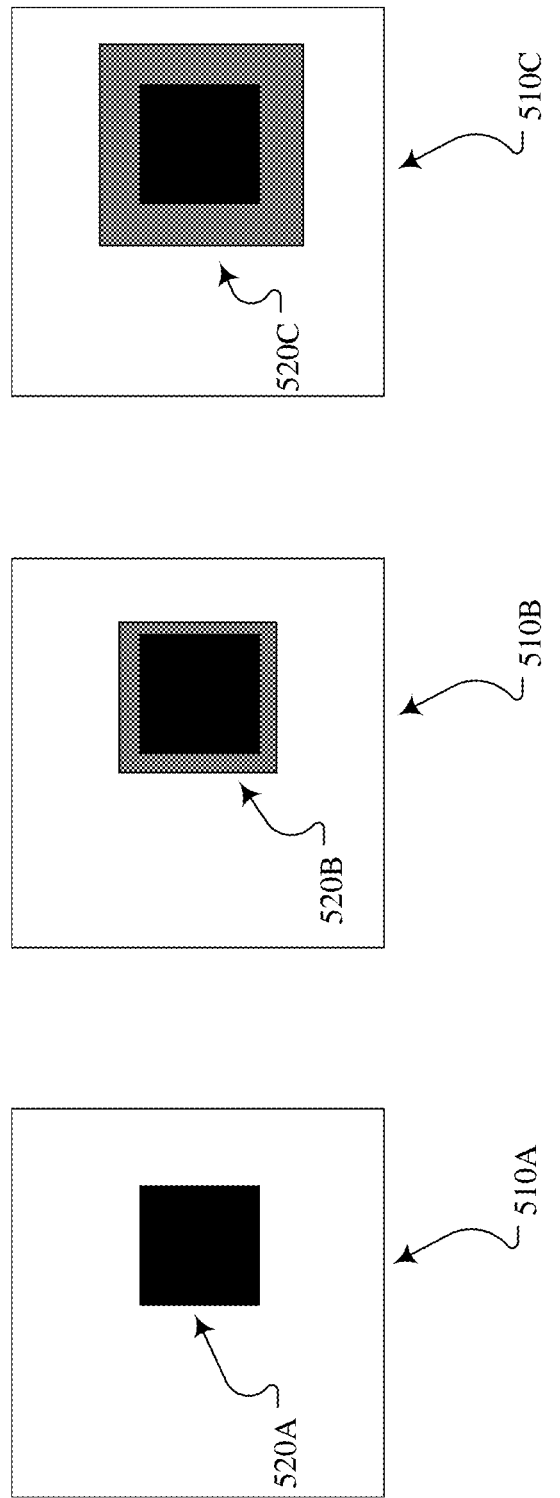
FIG. 5 illustrates a diagram depicting the impact of delta magnitude on the size of bounding boxes 520B and 520C, in accordance with embodiments of the present disclosure.

Referring now to FIG. 5, shown is a depiction of the impact of delta magnitude on the size of bounding boxes 520B and 520C, in accordance with embodiments. In this example, three frames, 510A, 510B, and 510C, are shown with bounding boxes 520A, 520B, and 520C, respectively. The bounding box 520A (in black) is overlaid on the diagram onto the other two bounding boxes (in grey) for purposes of comparison. In this example, the bounding box 520A is predicted by applying an object detection algorithm to frame 510A, while the bounding boxes 520B and 520C are predicted without applying the object detection algorithm to their corresponding frames due to the deltas for 510B (relative to 510A) and for 510C (also relative to 510) being less than a threshold. The delta for 510B is smaller than the delta for 510C.

As shown in the figure, the bounding boxes 520B and 520C are larger than the bounding box 520A. The relative sizes of the bounding boxes are determined based on their frames' respective deltas. In some embodiments, the increases in bounding box sizes may be proportional (e.g., directly proportional, exponentially proportional) to magnitudes of the deltas. For example, because the delta between frame 510B and 510A is smaller than the delta between the 510C and 510A, the bounding box in 520B is smaller than the bounding box 520C. This smaller size may correspond to a greater degree of precision in determining the location of the object tracked in the frame.

Referring now to FIG. 6, shown is an example snippet 650 of codec metadata that may be used in determining whether to selectively apply an object detection algorithm, in accordance with embodiments. As shown, snippet 650 includes codec metadata for three video frames labeled frames 10, 11, and 12 (as shown in bold). Also included in snippet 650 is the mean and standard deviation for the RGB values for each frame (also shown in bold). This metadata may be included in the metadata derived by a codec that is used to encode the video frames and then used by a corresponding codec to that is used to decode the video frames. In some embodiments, this codec metadata may be leveraged to determine whether to selectively apply the object detection algorithm to the frames.

In one example using this snippet 650, an object is detected, and a corresponding bounding box is predicted in frame 10 using the object detection algorithm. Next, the RGB mean and standard deviations (two parameters) are compared between frames 10 and 11 to determine a delta. In response to the delta being below a threshold, the bounding box in frame 11 is predicted based on the bounding box in frame 10 and without applying the object detection algorithm to frame 11. Next, the RGB mean and standard deviations are compared between frames 10 and 12 to determine a delta (this time for frame 12). In response to the new delta being above a threshold (e.g., because frame 11 is more similar to frame 10 than frame 12 is to frame 10), the bounding box in frame 12 is predicted by applying the object detection algorithm to frame 12.

In another example using this snippet 650, an object is detected, and a corresponding bounding box is predicted in frame 10 using the object detection algorithm. Next, the RGB mean and standard deviations (two parameters) are compared between frames 10 and 11 to determine whether the two frames are the substantially similar. Based on the comparison, the frames are determined to be substantially similar (e.g., based on being below a threshold) and the bounding box in frame 11 is accordingly predicted based on the bounding box in frame 10 and without applying the object detection algorithm to frame 11. Next, the RGB mean and standard deviations are compared between frames 10 and 12 to determine whether frames 10 and 12 are substantially similar. Based on the comparison, frames 10 and 12 are determined not to be substantially similar (e.g., based on exceeding a threshold). Based on the frames 10 and 12 not being substantially similar, the RGB values for each pixel in frames 10 and 12 (not shown) are converted to greyscale (on a 0 to 255 scale). The corresponding pixel greyscale values within the frames 10 and 12 are compared using matrix subtraction, and a delta value is calculated based on the resulting matrix. The magnitude of this delta for frame 12 is compared to a threshold. In response to the delta exceeding this threshold (which is a more permissive threshold than the one described earlier in this example), the bounding box in frame 12 is predicted by applying the object detection algorithm to frame 12.

As used herein, ordinal numbers (e.g., first, second, third) are merely used to identify corresponding items and are not intended to connote specific ordering or proximity of those items, in series or otherwise. This is especially true when these numbers are used to identify frames (e.g., first frame). For example, in many instances a first frame and second frame may be compared to each other. These frames may be in any order relative to each other in series and may have any number of frames between them.

Some embodiments of the present disclosure may offer various technical computing advantages over other approaches. These computing advantages address problems arising in the realm of efficient object detection and tracking in video frames by using the selective application of an object detection algorithm.

Figure 7:
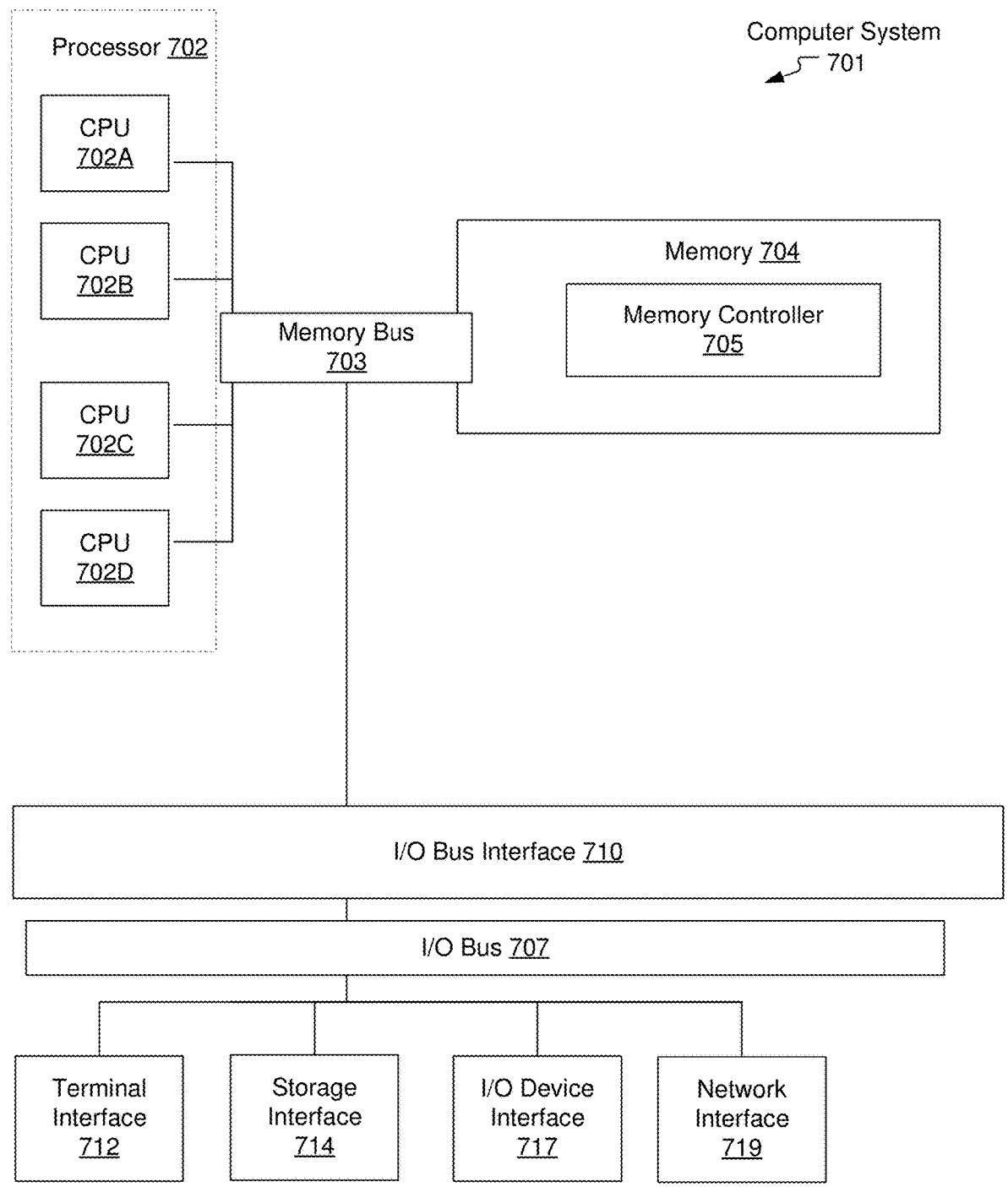
FIG. 7 illustrates a high-level block diagram of an example computer system that may be used in implementing embodiments of the present disclosure.

Referring now to FIG. 7, shown is a high-level block diagram of an example computer system (i.e., computer) 701 that may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 717, and a network interface 719, all of which may be communicatively coupled, directly or indirectly, for inter-component communication via a memory bus 703, an I/O bus 707, and an I/O bus interface unit 710.

The computer system 701 may contain one or more general-purpose programmable central processing units (CPUs) 702A, 702B, 702C, and 702D, herein generically referred to as the processer 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. In some embodiments, the main memory or memory subsystem 704 may contain elements for control and flow of memory used by the Processor 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 707 are shown as single respective units, the computer system 701 may, in some embodiments, contain multiple I/O bus interface units 710, multiple I/O buses 707, or both. Further, while multiple I/O interface units are shown, which separate the I/O bus 707 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method of selectively applying an object detection algorithm to frames in a video, the method comprising:
   analyzing a frame in the video using a set of neural networks of the object detection algorithm to detect a location of an object in the frame and predict a bounding box for the object in the frame;
   determining a magnitude of a delta between the frame and a second frame, wherein the magnitude of the delta is determined based on a difference between the two frames in values of at least one parameter of their respective sets of pixels; and
   responsive to the magnitude of the delta being less than a threshold, predicting a new bounding box for the object in the second frame without analyzing the second frame using the set of neural networks, wherein the new bounding box is predicted based on the bounding box and the magnitude of the delta such that the new bounding box is larger in area than the bounding box by an amount that is proportional to the magnitude of the delta.

2. The method of claim 1, wherein the values of at least one parameter of their respective sets of pixels for the two frames are identified in codec metadata generated by a codec that encoded the two frames.

3. The method of claim 2, wherein the values are mean Red Green Blue (RGB) values.

4. The method of claim 1, wherein the set of neural networks comprises one or more convolutional neural networks, and wherein the set of neural networks is an image classifier.

5. The method of claim 1, wherein the determining the magnitude of the delta is responsive to:
   comparing information identified from codec metadata for the two frames; and
   determining, based on the compared information, that the two frames are not the same or substantially similar based on a second threshold.

6. The method of claim 1, wherein the values are of individual pixels in the respective sets of pixels, and wherein the determining the magnitude of the delta comprises:
   comparing the values of the corresponding individual pixels between the two frames by applying matrix subtraction.

7. The method of claim 1, wherein the new bounding box for the object in the second frame is predicted without analyzing the second frame using the object detection algorithm.

8. The method of claim 1 further comprising:
   determining a magnitude of a new delta between the frame and a third frame, wherein the magnitude of the new delta is determined based on a difference between the frame and the third frame in values of at least one parameter of their respective sets of pixels; and
   responsive to the magnitude of the new delta exceeding the threshold, analyzing the third frame using the set of neural networks to detect a location of the object in the third frame and predict another new bounding box for the object in the third frame.

9. A computer program product for selectively applying an object detection algorithm to frames in a video, the computer program product comprising at least one computer readable storage medium that is not a transitory signal per se, the at least one computer readable storage medium having program instructions embodied therewith, the programs instructions configured, when executed by at least one computer, to cause the at least one computer to perform a method comprising:

analyzing a frame in the video using the object detection algorithm to detect an object in the frame and predict a bounding box for the object;

comparing codec metadata values derived during encoding of the video to determine a magnitude of a delta of at least one parameter of the pixels between the frame and a second frame; and responsive to the magnitude of the delta being less than a threshold, predicting a new bounding box for the object in the second frame without analyzing the second frame using the object detection algorithm, wherein the new bounding box is predicted based on the bounding box and the magnitude of the delta such that the new bounding box is larger in area than the bounding box by an amount that is proportional to the magnitude of the delta.

10. The computer program product of claim 9, wherein the at least one parameter includes mean Red Green Blue (RGB) values.

11. The computer program product of claim 9, wherein the method further comprises:

comparing the codec metadata values derived during encoding of the video to determine a magnitude of a new delta of at least one parameter of the pixels between the frame and a third frame; and responsive to the magnitude of the new delta exceeding the threshold, analyzing the third frame using the object detection algorithm to detect a location of the object in the third frame and predict another new bounding box for the object in the third frame.

12. A system for selectively applying an object detection algorithm to frames in a video, the system comprising:

at least one computer readable storage medium; and at least one processor in communication with the at least one computer readable storage medium, the at least one processor configured to obtain instructions from the at least one computer readable storage medium that cause the at least one processor to perform a method comprising:

analyzing a frame in the video using a set of neural networks of the object detection algorithm to detect a location of an object in the frame and predict a bounding box for the object in the frame;

determining a magnitude of a delta between the frame and a second frame, wherein the magnitude of the delta is determined based on a difference between the two frames in values of at least one parameter of their respective sets of pixels; and responsive to the magnitude of the delta being less than a threshold, predicting a new bounding box for the object in the second frame without analyzing the second frame using the set of neural networks, wherein the new bounding box is predicted based on the bounding box and the magnitude of the delta such that the new bounding box is larger in area than the bounding box by an amount that is proportional to the magnitude of the delta.

13. The system of claim 12, wherein the values of at least one parameter of their respective sets of pixels for the two frames are identified in codec metadata generated by a codec that encoded the two frames.

14. The system of claim 13, wherein the values are mean Red Green Blue (RGB) values.

15. The system of claim 12, wherein the set of neural networks comprises one or more convolutional neural networks, and wherein the set of neural networks is an image classifier.

16. The system of claim 12, wherein the determining the magnitude of the delta is responsive to:

comparing information identified from codec metadata for the two frames; and determining, based on the compared information, that the two frames are not the same or substantially similar based on a second threshold.

17. The system of claim 12, wherein the method further comprises:

determining a magnitude of a new delta between the frame and a third frame, wherein the magnitude of the new delta is determined based on a difference between the frame and the third frame in values of at least one parameter of their respective sets of pixels; and responsive to the magnitude of the new delta exceeding the threshold, analyzing the third frame using the set of neural networks to detect a location of the object in the third frame and predict another new bounding box for the object in the third frame.

* * * * *